(12) United States Patent
Choi

(10) Patent No.: US 12,280,775 B2
(45) Date of Patent: Apr. 22, 2025

(54) METHOD OF AND APPARATUS FOR CONTROLLING VEHICLE

(71) Applicant: HYUNDAI MOBIS CO., LTD., Seoul (KR)

(72) Inventor: Kwang Il Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 168 days.

(21) Appl. No.: 17/519,875

(22) Filed: Nov. 5, 2021

(65) Prior Publication Data

US 2022/0176955 A1  Jun. 9, 2022

(30) Foreign Application Priority Data

Dec. 3, 2020  (KR) .................. 10-2020-0167505

(51) Int. Cl.
*B60W 30/12* (2020.01)
*B60W 10/20* (2006.01)
(Continued)

(52) U.S. Cl.
CPC ............ *B60W 30/12* (2013.01); *B60W 10/20* (2013.01); *B60W 40/04* (2013.01);
(Continued)

(58) Field of Classification Search
CPC ...... B60W 30/12; B60W 10/20; B60W 40/04; B60W 40/072; B60W 2552/30;
(Continued)

(56) References Cited

U.S. PATENT DOCUMENTS 9,120,486 B1 * 9/2015 Mallinger ............. B60W 30/12
9,889,848 B2 * 2/2018 You ...................... B60W 30/12
(Continued)

FOREIGN PATENT DOCUMENTS

JP  2015191445 A  * 11/2015
KR  10-2018-0075966 A  7/2018

OTHER PUBLICATIONS

JP2015191445A—Description Translation Title: Driving Assistance Device Author: Matsumoto et al. Date: Feb. 11, 2015 (Year: 2025).*

*Primary Examiner* — Khoi H Tran
*Assistant Examiner* — Trang Dang
(74) *Attorney, Agent, or Firm* — NSIP Law

(57) ABSTRACT

Method of controlling a vehicle on a branch road, including determining whether a vehicle is traveling on a last lane of a road, monitoring movement in a lateral direction of a preceding vehicle, determining whether a curvature difference between a left lane and a right lane for the vehicle meets a threshold, determining whether an amount of movement in the lateral direction of the preceding vehicle is smaller than a reference movement, in response to the curvature difference between the left vehicle lane and the right vehicle lane meeting the threshold, and correcting vehicle lane information associated with an exit road side of the last lane using vehicle lane information associated with an opposite side of the last lane where the exit road is connected to the road, in response to the amount of movement in the lateral direction of the preceding vehicle being smaller than the reference movement.

12 Claims, 4 Drawing Sheets

(51) Int. Cl.
*B60W 40/04* (2006.01)
*B60W 40/072* (2012.01)
*G06V 20/56* (2022.01)
*G06V 20/58* (2022.01)

(52) U.S. Cl.
CPC ......... *B60W 40/072* (2013.01); *G06V 20/584* (2022.01); *G06V 20/588* (2022.01); *B60W 2552/30* (2020.02); *B60W 2552/53* (2020.02); *B60W 2554/4044* (2020.02)

(58) Field of Classification Search
CPC ...... B60W 2552/53; B60W 2554/4044; G06V 20/584; G06V 20/588
See application file for complete search history.

(56) References Cited

U.S. PATENT DOCUMENTS

| | | | | |
|---|---|---|---|---|
| 10,625,740 | B2* | 4/2020 | Nath | G05D 1/0212 |
| 2018/0120859 | A1* | 5/2018 | Eagelberg | G01C 21/3658 |
| 2018/0292822 | A1* | 10/2018 | Ichikawa | G05D 1/0257 |
| 2020/0307590 | A1* | 10/2020 | VanderLugt | B60W 30/0956 |
| 2021/0387619 | A1* | 12/2021 | Yatagai | B60W 30/146 |

* cited by examiner

METHOD OF AND APPARATUS FOR CONTROLLING VEHICLE

CROSS REFERENCE TO RELATED APPLICATION

The present application claims the benefit under 35 USC § 119(a) of Korean Patent Application No. 10-2020-0167505, filed Dec. 3, 2020, in the Korean Intellectual Property Office, the entire disclosure of which is incorporated herein by reference for all purposes.

BACKGROUND OF THE INVENTION

Field

The following description relates to a technology for a vehicle to keep traveling on a vehicle lane.

Description of Related Art

In recent years, there has been an ever-increasing trend to employ Advanced Driver Assistance Systems (ADAS) or autonomous traveling technologies. Among these technologies, a technology for automatically keeping traveling on a vehicle lane is one of fundamental and important technologies.

Due to the presence of an exit road branching off from a main road, when keeping traveling on a vehicle lane, a vehicle currently traveling on the last vehicle lane of the main road experiences confusion in a reference for vehicle-lane keeping control. Thus, control stability of the vehicle is decreased during traveling on a branch road.

The foregoing is intended merely to aid in the understanding of the background of the present disclosure, and is not intended to mean that the present disclosure falls within the purview of the related art that is already known to those skilled in the art.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented method of controlling a vehicle traveling on a branch road, the method including determining whether a vehicle is traveling on a last lane of a main road, monitoring an amount of movement in a lateral direction of a preceding vehicle, in response to the vehicle traveling on the last lane, determining whether a curvature difference between a left vehicle lane and a right vehicle lane for the vehicle meets a threshold, determining whether the amount of movement in the lateral direction of the preceding vehicle is smaller than a reference movement, in response to the curvature difference between the left vehicle lane and the right vehicle lane meeting the threshold, and correcting vehicle lane information associated with an exit road side of the last lane using vehicle lane information associated with a side of the last lane opposite to a side where the exit road is connected to the main road, in response to the amount of movement in the lateral direction of the preceding vehicle being smaller than the reference movement.

The determining of whether the vehicle is traveling on the last lane of the main road may include determining that the vehicle is traveling on the last lane, in response to detecting that the last lane and a road border are located on the side of the main road where the exit road is connected to the main road and only a vehicle lane is detected opposite to the side where the exit road is connected to the main road.

The determining of whether the amount of movement in the lateral direction of the preceding vehicle is smaller than the reference movement may include determining the amount of movement in the lateral direction of the preceding vehicle is smaller than the reference movement based on a comparison of the amount of movement in the lateral direction of the preceding vehicle travelling through a position at which the curvature difference between the left vehicle lane and the right vehicle lane is at or above the threshold with the reference movement.

The determining of whether the amount of movement in the lateral direction of the preceding vehicle is smaller than the reference movement may include determining the amount of movement in the lateral direction of the preceding vehicle is smaller than the reference movement based on setting the reference movement is to a positive number, setting an amount of movement by which the preceding vehicle moves in a direction of the exit road to be a positive number, setting an amount of movement by which the preceding vehicle moves in a direction away from the exit road to be a negative number, and comparing these amounts of movement with the reference movement.

The method may include determining whether vehicle lane information associated with the side where the exit road is connected to the main road and information on a vehicle road border are similar to each other, in response to the amount of movement in the lateral direction of the preceding vehicle being equal to or larger than the reference movement, wherein correcting the vehicle lane information associated with the exit road side using the vehicle lane information associated with the side opposite to the side where the exit road is connected to the main road, in response to determining that the vehicle lane information associated with the side where the exit road is connected with the main road and the information on the vehicle road border are similar to each other.

In another general aspect, there is provided an apparatus for controlling a vehicle traveling on a branch road, the apparatus including forward-viewing imaging sensor configured to detect lanes adjacent to both sides of a road on which the vehicle travels and a preceding vehicle, a vehicle lane determiner configured to determining whether the vehicle is traveling on the last lane of the road, using a signal of the forward-view imaging sensor, a monitor configured to monitor an amount of movement in a lateral direction of the preceding vehicle, using the signal of the forward-view imaging sensor, a curvature determiner configured to determine whether a curvature difference between a left vehicle lane and a right vehicle lane meets a threshold, using the signal of the forward-view imaging sensor, an amount-of-movement determiner configured to determining whether the amount of movement in the lateral direction of the preceding vehicle is smaller than a reference movement, in response to the curvature difference between the left vehicle lane and the right vehicle lane meeting the threshold, and a vehicle lane corrector configured to correct vehicle lane information associated with an exit road side of the last lane using vehicle lane information associated with a side of the last lane opposite to a side where the exit road is connected to the road, in response to the amount of movement in the lateral direction of the preceding vehicle being smaller than the reference movement.

The vehicle lane determiner may be configured to determine that the vehicle is traveling on the last vehicle lane of the road, in response to determining that the last lane and a road border are located on the side of the road where the exit road is connected to the road and only a vehicle lane is detected opposite to the side where the exit road is connected to the road.

The amount-of-movement determiner may be configured to compare the amount of movement in the lateral direction of the preceding vehicle travelling through a position at which the curvature difference between the left vehicle lane and the right vehicle lane is at or above the threshold, with the reference movement.

The amount-of-movement determiner may be configured to set the reference movement to a positive number, to set an amount of movement by which the preceding vehicle moves in a direction of the exit road to be a positive number, to set an amount of movement by which the preceding vehicle moves in a direction away from the exit road to be a negative number, and to compare these amounts of movement with the reference movement.

The vehicle lane determiner may be configured to determine whether or vehicle lane information associated with the side where the exit road is connected to the road and information on a vehicle road border are similar to each other, in response to the amount of movement in the lateral direction of the preceding vehicle being equal to or larger than the reference movement, and the vehicle lane corrector may be configured to correct the vehicle lane information associated with the exit road side using the vehicle lane information associated with the side opposite to the side where the exit road is connected to the road, in response to determining that the vehicle lane information associated with the side where the exit road is connected with the road and the information on the vehicle road border are similar to each other.

The apparatus may include a vehicle-lane-keeping controller configured to maintain the vehicle on the vehicle lane on which the vehicle is currently traveling, by controlling a vehicle steering apparatus using the vehicle lane information corrected by the vehicle lane corrector.

Other features and aspects will be apparent from the following detailed description, the drawings, and the claims.

Figure 1:
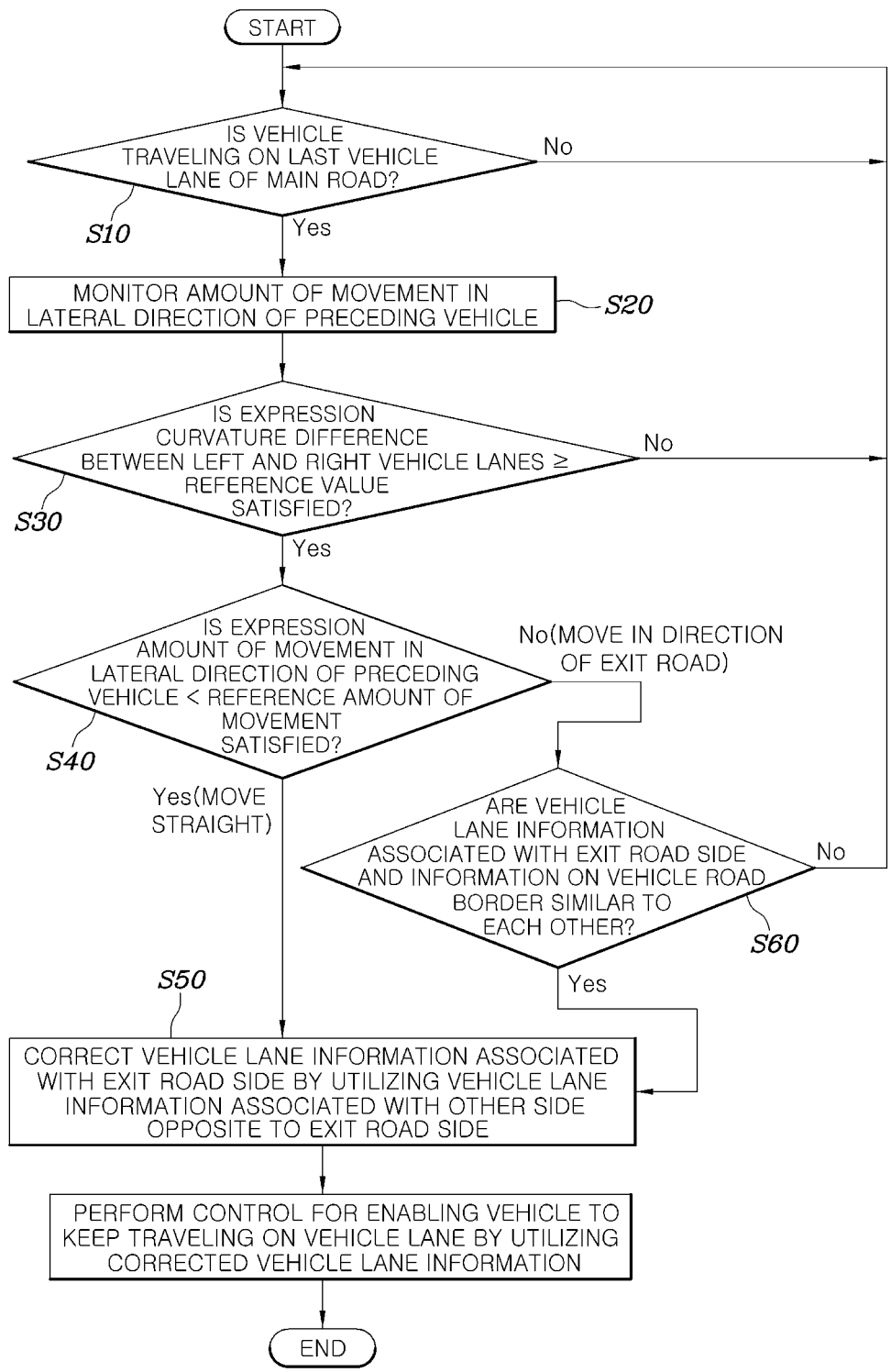
FIG. 1 is a flowchart illustrating a method of controlling a vehicle traveling on a branch road according to an embodiment of the present invention.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF THE INVENTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Desired embodiments of the present invention will be described in detail below with reference to the accompanying drawings. The same reference character on the drawings refers to the same constituent element.

Figure 2:
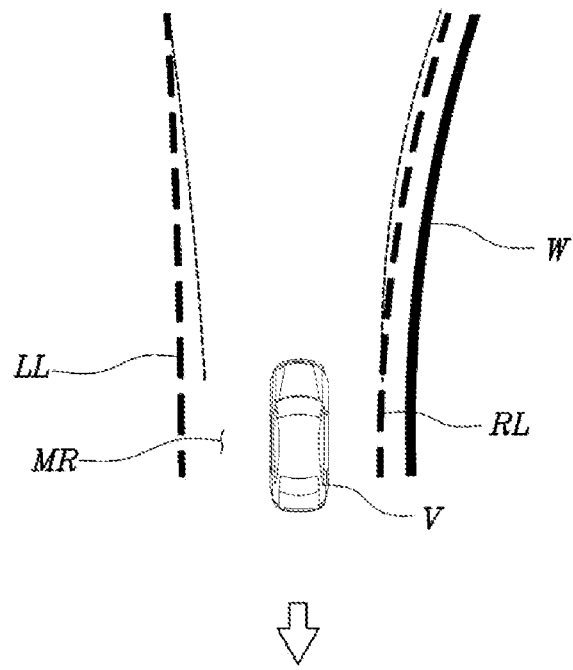
FIG. 2 is a view illustrating the method of controlling a vehicle traveling on a branch road according to the present invention.
Figure 2:
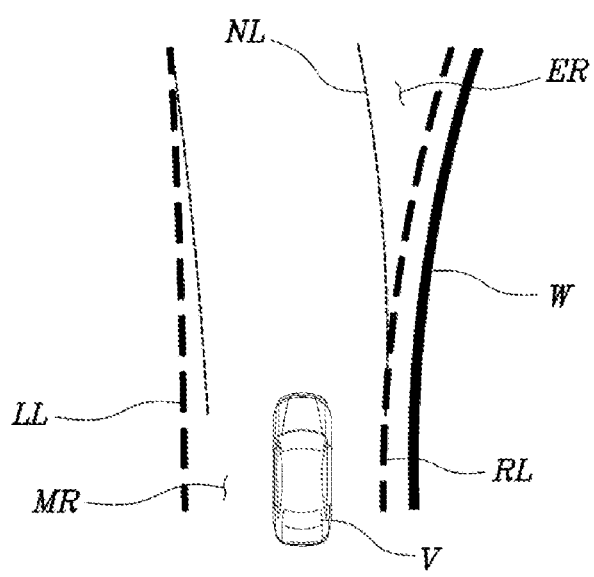
Figure 3:
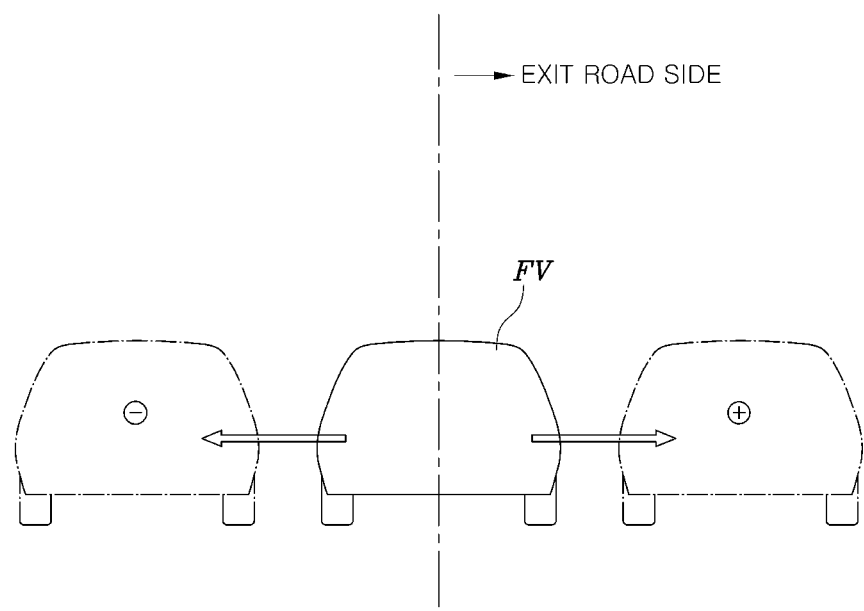
FIG. 3 is a view illustrating that an amount of movement of a preceding vehicle according to the present invention.

With reference to FIGS. 1 to 3, a method of controlling a vehicle traveling on a branch road according to an embodiment of the present invention is configured to include Step S10 of determining whether or not a vehicle V (e.g., a host vehicle) is traveling on the last vehicle lane of a main road; Step S20 of monitoring an amount of movement in a lateral direction of a preceding vehicle FV; Step S30 of determining whether or not a curvature difference between a left vehicle lane LL (i.e., LL being a left vehicle lane border) and a right vehicle lane RL (i.e., RL being a right vehicle lane border) for the vehicle V is at or above a predetermined reference value (may also be referred to as "threshold"); Step S40 of determining whether or not the amount of movement in the lateral direction of the preceding vehicle FV is smaller than a predetermined reference amount of movement (may also be referred to as "reference movement"), when the curvature difference between the left vehicle lane LL and the right vehicle lane RL is at or above the predetermined reference value; and Step S50 of correcting vehicle lane information associated with the exit road ER side using vehicle lane information associated with the other side opposite to one side where the exit road ER is connected, when the amount of movement in the lateral direction of the preceding vehicle FV is smaller than the predetermined reference amount of movement.

That is, according to the present invention, in a case where the vehicle V is traveling on the last vehicle lane of the main road from which the exit road ER branches off, because the curvature difference between the left vehicle lane LL and the right vehicle lane RL is at or above the predetermined reference value, when it is determined that there is a high likelihood that the last vehicle lane will be a portion to which the exit road ER is connected, the amount of movement in the lateral direction of the preceding vehicle FV is compared with the predetermined reference amount of movement. As a result of the comparison, in a case where it is determined that the preceding vehicle travels straight without any lane change instead of traveling in the exit road ER side, the vehicle lane information associated with the exit road ER side is quickly corrected without any additional checking, and thus the vehicle V is enabled to keep traveling on a vehicle lane, using the vehicle lane information corrected as described above. Accordingly, vehicle steering control is performed in a stable and smooth manner without causing a shake. Consequently, the vehicle V is enabled to pass in a stable state along the portion of the main road MR to which the exit road ER is connected.

The main road MR here means a two-or-more lane vehicle road on which the vehicle V in which the present invention finds application travels. The last vehicle lane here means, as an outermost lane of the main road MR, a vehicle lane which is the most adjacent to the exit road ER and from which the exit road ER substantially branches off.

In Step S10 of determining whether or not the vehicle V is traveling on the last vehicle lane of the main road MR, in a case where a vehicle lane and a vehicle road border W are together detected on the one side where the exit road ER is connected to a vehicle road on which the vehicle V is traveling and where only the vehicle lane is detected on the other side opposite to the one side, it may be determined that the vehicle V is traveling on the last vehicle lane of the main road MR.

The vehicle road border W here means all objects that can indicate a road border area other than a vehicle lane, such as a curbstone physically protruding from a surface of a vehicle road, a guard rail, and a vehicle road wall.

That is, in a case where the vehicle V is traveling on the last vehicle lane of the main road MR, it is normal that only a vehicle lane may be detected on one side and that the vehicle lane and the vehicle road border W may be detected together on the other side, that is, on the side where the exit road ER is connected. With the detection of this difference, it is determined that the vehicle V is traveling on the last vehicle lane.

Of course, in a case where identification of the vehicle road on which the vehicle V is traveling is possible with a large-scale map and a navigation device, and a high-precision global positioning system (GPS), the technology, as described above, that is embodied in the present invention may be together used. Thus, a situation where the vehicle V is traveling on the last vehicle lane may be recognized with a high degree of reliability.

In Step S20 of monitoring the amount of movement in the lateral direction of the preceding vehicle FV, necessary data are generated and stored in such a manner that an amount of movement by which the preceding vehicle FV moves in the lateral direction with respect to a traveling direction of the vehicle V for an interval between arbitrary two points in time at a certain position on a vehicle road will be verified at a later point in time.

Step S30 of determining whether or not the curvature difference between the left vehicle lane LL and the right vehicle lane RL for the vehicle V is at or above the predetermined reference value is performed in order to determine whether or not the vehicle V substantially starts to pass along the portion to which the exit road ER is connected.

That is, when the vehicle V travels a portion to which the exit road ER is not connected, the respective curvature of the left vehicle lane LL and the right vehicle lane RL for the vehicle V have a range of values approximately similar to each other. However, when the portion to which the exit road ER is connected is approached, a great difference occurs between respective curvatures of vehicle lanes adjacent to both sides, respectively, of the vehicle V. With identification of this difference, it is primarily determined whether or not the vehicle V currently starts to travel on the portion from which the exit road ER branches off.

Therefore, for the purpose as described above, through many experiments and analyses at the design stage, the predetermined reference value may be determined as a value on the basis of which the portion from which the exit road ER branches off is identified.

In Step S40 of determining whether or not the amount of movement in the lateral direction of the preceding vehicle FV is smaller than the predetermined reference amount of movement, the amount of movement in the lateral direction that is obtained while the preceding vehicle FV travels through a position at which the curvature difference between the left vehicle lane LL and the right vehicle lane RL is at or above the predetermined reference value is compared with the predetermined reference amount of movement.

That is, because the curvature difference between the left and right vehicle lanes is at or above the predetermined reference value, once when there is a high likelihood that a vehicle lane will be a portion from which an exit vehicle lane branches off, the amount of movement in the lateral direction that is obtained while the preceding vehicle FV travels on this portion is compared with the predetermined reference amount of movement.

At this point, the predetermined reference amount of movement is set to a positive number. Furthermore, as illustrated in FIG. 3, an amount of movement by which the preceding vehicle FV moves in the direction of the exit road ER is set to be expressed as a positive number, and an amount of movement by which the preceding vehicle FV moves in the opposite direction is set to be expressed as a negative number. These amounts of movement are compared with the predetermined reference amount of movement.

Therefore, if the amount of movement in the lateral direction that is obtained while the preceding vehicle FV travels is smaller than the predetermined reference amount of movement, it may be determined not only that the preceding vehicle FV does not move toward the exit road ER side, but also that the preceding vehicle FV travels straight without any lane change on a vehicle road on which the preceding vehicle FV currently travels. Therefore, according to the present invention, it may be ensured that it is safe for the vehicle V to travel straight without any lane change, following the preceding vehicle FV. Accordingly, as described above, the vehicle lane information associated with the exit road ER side is corrected using the vehicle lane information associated with the other side opposite to the one side where the exit road ER is connected. Then, vehicle-lane keeping control is continuously performed using the corrected vehicle lane information. Thus, suitable and stable control for enabling the vehicle V to keep traveling on a vehicle lane is performed. Accordingly, the safety and reliability of the vehicle V can be improved.

For reference, in FIG. 2, it is illustrated that, in a situation where the exit road ER branches off in the rightward direction from the main road MR, the right vehicle lane RL is corrected with the determination as described above using information on the left vehicle lane LL and that a corrected vehicle lane NL is generated.

Therefore, as described above, it is desirable that the predetermined reference amount of movement is set to a level on the basis of which a situation where the preceding vehicle FV travels from the main road MR through the exit road ER and a situation where, otherwise, the preceding vehicle FV continues traveling straight on a vehicle lane on which the preceding vehicle FV currently travels are distinguished from each other. The predetermined reference amount of movement may also be determined through many experiments and analyses at the design stage.

In a case where the amount of movement in the lateral direction of the preceding vehicle FV is equal to or larger than the predetermined reference amount of movement, Step S60 of determining whether or not vehicle lane information associated with the one side where the exit road ER is connected and information on the vehicle road border W are similar to each other is further performed. In a case where it is determined that the vehicle lane information associated with the exit road ER side is connected and the information on the vehicle road border W are similar to each other, Step S50 of correcting the vehicle lane information associated with the exit road ER side using the vehicle lane information associated with the other side opposite to the one side where the exit road ER is connected may be set to be performed.

That is, when the amount of movement in the lateral direction of the preceding vehicle FV is equal to or larger than the predetermined reference amount of movement, there is a high likelihood that the preceding vehicle FV will travel toward the exit road ER side. However, the main road MR itself may be curved in the direction in which the exit road ER is expected to appear. Therefore, as described above, it is determined whether or not the vehicle lane information associated with the one side where the exit road ER is connected and the information on the vehicle road border W are similar to each other, and then a situation where the exit road ER is actually connected is verified. Thereafter, in order that the vehicle V in which the present invention finds application continues traveling straight, the vehicle lane is corrected as described above, and thus the vehicle V is enabled to keep traveling on a vehicle lane using the corrected vehicle lane.

Figure 4:
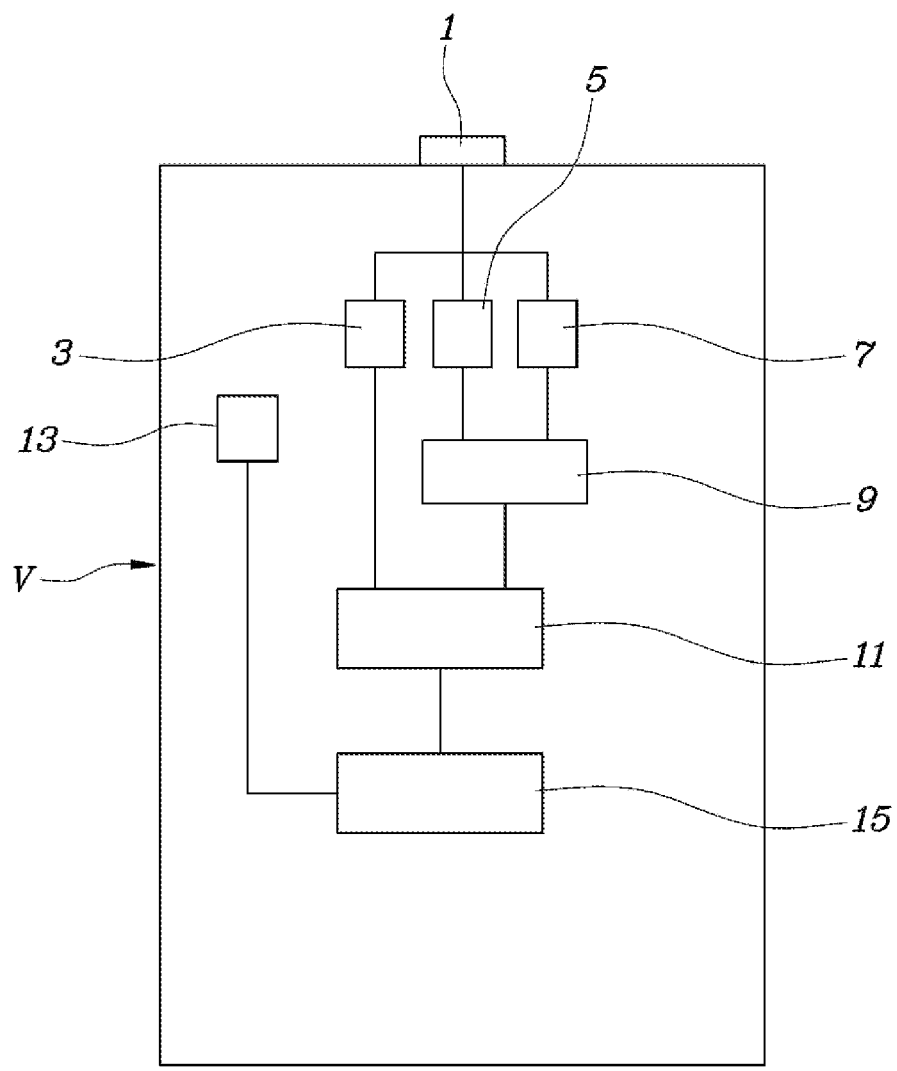
FIG. 4 is a view illustrating a configuration of an apparatus for controlling a vehicle traveling on a branch road.

With reference to FIG. 4, an apparatus for controlling a vehicle to traveling on a branch road is configured to include a forward-view imaging sensor 1 provided in such a manner to detect vehicle lanes adjacent to both sides, respectively, of a vehicle road on which a vehicle V travels and a preceding vehicle FV; a vehicle lane determination unit 3 (may also be referred to as vehicle lane determiner 3) determining whether or not the vehicle V is traveling on the last vehicle lane of a main road MR, using a signal of the forward-view imaging sensor 1; a monitoring unit 5 (may also be referred to as monitor 5) monitoring an amount of movement in a lateral direction of the preceding vehicle FV, using the signal of the forward-view imaging sensor 1; a curvature determination unit 7 (may also be referred to as curvature determiner 7) determining whether or nota curvature difference between a left vehicle lane LL and a right vehicle lane RL for the vehicle V is at or above a predetermined reference value, using the signal of the forward-view imaging sensor 1; an amount-of-movement determination unit 9 (may also be referred to as amount-of-movement determiner 9) determining whether or not the amount of movement in the lateral direction of the preceding vehicle FV observed by the monitoring unit 5 is smaller than a predetermined reference amount of movement, when the curvature difference between the left vehicle lane LL and the right vehicle lane RL is at or above the predetermined reference value; and a vehicle lane correction unit 11 (may also be referred to as vehicle lane corrector 11) correcting vehicle lane information associated with the exit road ER side using vehicle lane information associated with the other side opposite to one side where the exit road ER determined by the vehicle lane determination unit 3 is connected, in a case where the amount of movement in the lateral direction of the preceding vehicle FV is smaller than the predetermined reference amount of movement.

The forward-view imaging sensor 1 may be configured as a forward-view camera or the like. A single forward-view camera may be provided. A plurality of forward-view cameras may be provided in such a manner that the monitoring of the preceding vehicle FV is performed with a separate forward-view camera.

The vehicle lane determination unit 3 may be configured in such a manner as to determine that the vehicle V is traveling on the last vehicle lane of the main road MR in a case where a vehicle lane and a vehicle road border W are together detected on one side where the exit road ER is connected to a vehicle road on which the vehicle V is traveling and where only the vehicle lane is detected on the other side opposite to the one side.

The amount-of-movement determination unit 9 may be configured in such a manner as to compare the amount of movement in the lateral direction, which is obtained while the preceding vehicle FV travels through a position at which the curvature difference between the left vehicle lane LL and the right vehicle lane RL is at or above the predetermined reference value, with the predetermined reference amount of movement.

The amount-of-movement determination unit 9 may be configured in such a manner that the predetermined reference amount of movement is set to a positive number, that the amount of movement by which the preceding vehicle FV moves in a direction of the exit road ER is set to be expressed as a positive number, that the amount of movement by which the preceding vehicle FV moves in the opposite direction is set to be expressed as a negative number, and that these amounts of movement are compared with the predetermined reference amount of movement.

The vehicle lane determination unit 3 may be configured in such a manner that, in the case where the amount of movement in the lateral direction of the preceding vehicle FV is equal to or larger than the predetermined reference amount of movement, it is determined whether or not vehicle lane information associated with the one side where the exit road ER is connected and information on the vehicle road border W are similar to each other. Furthermore, the vehicle lane correction unit 11 may be configured in such a manner that, in the case where it is determined that the vehicle lane information associated with the one side where the exit road ER is connected and the information on the vehicle road border W are similar to each other, the vehicle lane information associated with the exit road ER side is corrected using the vehicle lane information associated with the other side opposite to the one side where the exit road ER is connected.

In addition, the apparatus for controlling a vehicle traveling on a branch road may be configured to further include a vehicle-lane-keeping controller 15 that enables the vehicle V to keep traveling on the vehicle lane by controlling a vehicle steering apparatus 13 using the vehicle lane information corrected by the vehicle lane correction unit 11.

An objective of the present invention is to provide a method of controlling a vehicle traveling on a branch road and an apparatus for controlling a vehicle traveling on a branch road, the method and the apparatus being capable of performing suitable and stable vehicle-lane keeping control, thereby preventing confusion that, due to an exit road branching off from a main road, may be caused when a vehicle currently traveling on the last vehicle lane of the main road performs vehicle-lane keeping control. With the apparatus and the method, the stability and reliability of the vehicle can be improved, and thus the marketability thereof can be improved.

The vehicle lane determiner, monitor, curvature determiner, amount-of-movement determiner, vehicle lane corrector, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of controlling a host vehicle, the method comprising:
    determining whether the host vehicle is traveling on a last lane of a main road, the main road including at least a left vehicle lane border and a right vehicle lane border, and the last lane being an outermost lane of the main road which is adjacent to an exit road branching from the main road;
    monitoring an amount of movement in a lateral direction of a preceding vehicle;
    determining whether a curvature difference between the left vehicle lane border and the right vehicle lane border for the host vehicle meets a threshold;
    determining whether the amount of movement in the lateral direction of the preceding vehicle is smaller than a reference movement, in response to the curvature difference between the left vehicle lane border and the right vehicle lane border meeting the threshold;
    determining whether vehicle lane information associated with a side of the main road where the exit road is connected and information on a vehicle road border are similar to each other, in response to the amount of movement in the lateral direction of the preceding vehicle being equal to or larger than the reference movement;
    correcting the vehicle lane information associated with the exit road side using the vehicle lane information associated with the side opposite to the side where the exit road is connected to the main road, in response to determining that the vehicle lane information associated with the side of the main road where the exit road is connected and the information on the vehicle road border are similar to each other; and
    performing control for enabling the host vehicle to keep traveling on a vehicle lane by utilizing the corrected vehicle lane information.

2. The method of claim 1, wherein the determination of whether the host vehicle is traveling on the last lane of the main road comprises:
    determining that the host vehicle is traveling on the last lane, in response to detecting that the last lane and a road border are located on the side of the main road where the exit road is connected to the main road and only a vehicle lane is detected opposite to the side where the exit road is connected to the main road.

3. The method of claim 1, the determining of whether the amount of movement in the lateral direction of the preceding vehicle is smaller than the reference movement comprises:
    determining the amount of movement in the lateral direction of the preceding vehicle is smaller than the reference movement based on a comparison of the amount of movement in the lateral direction of the preceding vehicle travelling through a position at which the curvature difference between the left vehicle lane border and the right vehicle lane border meets or exceeds the threshold with the reference movement.

4. The method of claim 3, wherein the determination of whether the amount of movement in the lateral direction of the preceding vehicle is smaller than the reference movement comprises:
    determining the amount of movement in the lateral direction of the preceding vehicle is smaller than the reference movement based on setting the reference movement to a positive number, setting an amount of movement by which the preceding vehicle moves in a direction of the exit road to be a positive number, setting an amount of movement by which the preceding vehicle moves in a direction away from the exit road to be a negative number, and comparing these amounts of movement with the reference movement.

5. The method of claim 1, wherein the last lane is closest to the exit among the one or more lanes of the main road.

6. The method of claim 1, wherein the road border includes at least one object other than a vehicle lane border, the at least one object comprising a curbstone physically protruding from a surface of a vehicle road, a guard rail, a vehicle road wall, or any combination thereof.

7. An apparatus for controlling a host vehicle, the apparatus comprising:
a forward-viewing imaging sensor configured to detect lane borders adjacent to both sides of a lane of a main road on which the host vehicle and a preceding vehicle travel;
a controller configured to:
control a vehicle lane determiner to determine whether the host vehicle is traveling on a last lane of the main road, based on detection results of the forward-view imaging sensor, the main road including at least a left vehicle lane border and a right vehicle lane border, and the last lane being an outermost lane of the main road which is adjacent to an exit road branching from the main road;
control a monitor to monitor an amount of movement in a lateral direction of the preceding vehicle, based on the detection results of the forward-view imaging sensor;
control a curvature determiner to determine whether a curvature difference between the left vehicle lane border and the right vehicle lane border for the host vehicle meets a threshold, based on the detected results of the forward-view imaging sensor;
control an amount-of-movement determiner to determine whether the amount of movement in the lateral direction of the preceding vehicle is smaller than a reference movement, in response to the curvature difference between the left vehicle lane border and the right vehicle lane border meeting the threshold,
control the vehicle lane determiner to determine whether vehicle lane information associated with a side of the main road where the exit road is connected to the main road and information on a vehicle road border are similar to each other, in response to the amount of movement in the lateral direction of the preceding vehicle being equal to or larger than the reference movement;
control a vehicle lane corrector to correct the vehicle lane information associated with the exit road side using the vehicle lane information associated with the side opposite to the side where the exit road is connected to the main road, in response to determining that the vehicle lane information associated with the side of the main road where the exit road is connected and the information on the vehicle road border are similar to each other; and
perform control for enabling the host vehicle to keep traveling on a vehicle lane by utilizing the corrected vehicle lane information.

8. The apparatus of claim 7, wherein the controller is further configured to control the vehicle lane determiner to determine that the host vehicle is traveling on the last lane of the main road, in response to determining that the last lane and a road border are located on the side of the main road where the exit road is connected to the main road and only a vehicle lane is detected opposite to the side where the exit road is connected to the main road.

9. The apparatus of claim 7, wherein the controller is further configured to control the amount-of-movement determiner to compare the amount of movement in the lateral direction of the preceding vehicle travelling through a position at which the curvature difference between the left vehicle lane border and the right vehicle lane border meets or exceeds the threshold, with the reference movement.

10. The apparatus of claim 9, wherein the controller is further configured to control the amount-of-movement determiner to:
set the reference movement to a positive number;
set an amount of movement by which the preceding vehicle moves in a direction of the exit road to be a positive number;
set an amount of movement by which the preceding vehicle moves in a direction away from the exit road to be a negative number; and
compare these amounts of movement with the reference movement.

11. The apparatus of claim 7, wherein the controller is further configured to control a vehicle-lane-keeping controller to maintain the host vehicle on the vehicle lane on which the host vehicle is currently traveling, by controlling a vehicle steering apparatus using the vehicle lane information corrected by the vehicle lane corrector.

12. The apparatus of claim 7, wherein the road border includes at least one object other than a vehicle lane border, the at least one object comprising a curbstone physically protruding from a surface of a vehicle road, a guard rail, a vehicle road wall, or any combination thereof.

* * * * *